(12) United States Patent
Jakobsson

(10) Patent No.: US 8,549,641 B2
(45) Date of Patent: Oct. 1, 2013

(54) PATTERN-BASED APPLICATION CLASSIFICATION

(75) Inventor: Bjorn Markus Jakobsson, Mountain View, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 414 days.

(21) Appl. No.: 12/553,658

(22) Filed: Sep. 3, 2009

(65) Prior Publication Data

US 2011/0055925 A1   Mar. 3, 2011

(51) Int. Cl.
*H04L 29/06* (2006.01)

(52) U.S. Cl.
USPC ............................................. 726/23; 726/25

(58) Field of Classification Search
None
See application file for complete search history.

(56) References Cited

U.S. PATENT DOCUMENTS

2005/0060562 A1* 3/2005 Bhattacharya et al. ........ 713/200
2008/0127337 A1* 5/2008 Dawson et al. .................. 726/22

* cited by examiner

*Primary Examiner* — Gilberto Barron, Jr.
*Assistant Examiner* — Izunna Okeke
(74) *Attorney, Agent, or Firm* — Shun Yao; Park, Vaughan, Fleming Dowler LLP

(57) ABSTRACT

Embodiments of present disclosure provide a method and system for remotely auditing a security posture of a client machine at a centralized server. The system receives an integrity-protected report from the client machine, or other devices related to the client machine, the report comprising entries associated with security events or security states or both related to the client machine. The report entries comprise characteristics of the security events or security states to facilitate identification of a probable security attack at the client machine. The system also detects a pattern among one or more reports. Finally, the system classifies the security posture of the client machine based on the detected pattern, which could indicate a probable security attack at the client machine.

24 Claims, 12 Drawing Sheets

| PATTERN 900 | CLASSIFICATION 950 |
|---|---|
| CORRELATION BETWEEN SECURITY EVENTS OR SECURITY STATES AND GEO CHARACTERISTIC AS A FUNCTION OF TIME | MALWARE SPREADING VIA WIRELESS CONNECTION |
| CORRELATION BETWEEN SECURITY EVENTS OR SECURITY STATES AND SOCIAL CHARACTERISTIC | MALWARE SPREADING VIA ATTACHMENTS |
| OCCURRENCE OF SECURITY EVENTS OR SECURITY STATES INDEPENDENT OF LOCAL TIME CHARACTERISTIC | WORM |
| OCCURRENCE OF SECURITY EVENTS OR SECURITY STATES AT NOTABLY MORE THAN NORMAL FREQUENCY | MALWARE |
| CONSISTENT INCLUSION OF A CHARACTERISTIC DURING SECURITY EVENTS OR SECURITY STATES | MALWARE |
| OCCURRENCE OF SECURITY EVENTS OR SECURITY STATES AS A FUNCTION OF PLATFORM, APPLICATION OR CONFIGURATION | MALWARE |
| ... ... | ... ... |

FIG. 9

PATTERN-BASED APPLICATION CLASSIFICATION

BACKGROUND

1. Field

This disclosure is generally related to network security. More specifically, this disclosure is related to a method and system for intrusion detection at a centralized server.

2. Related Art

Malware is malicious software that is designed to infiltrate or damage a computing device without an owner's informed consent. Malware can include computer viruses, worms, Trojan horses, rootkits, spyware, adware, and so on. Malware has become a common way to commit online fraud. An intrusion detection system is software and/or hardware designed to detect unwanted attempts at accessing, manipulating, or disabling of computer systems through a network.

Signature detection is a technique often used in intrusion detection systems. In the signature detection process, network or system information is scanned against a known attack or malware signature database. If a match is found, an alert takes place for further actions. This technique requires the signatures to be constantly updated in order to mitigate emerging threats. Moreover, malware programmers increasingly utilize code obfuscation techniques to cloak their malware. For example, malware programmers can use polymorphic algorithms to mutate their codes, thus making it difficult for intrusion detection systems to detect the malicious codes.

Another commonly used technique in intrusion detection systems is anomalous behavior detection. In the anomalous behavior detection process, the intrusion detection systems generate a statistical baseline of the traffic on a network, and flag any traffic that does not fit the statistical norm behavior. However, the anomalous behavior detection is both costly and prone to errors.

In addition, with the explosive adoption rates of smart phones and other types of mobile devices, mobile malware infection is expected to escalate in the near future. Because mobile devices have inherent limitations, such as power, memory, and bandwidth, current intrusion detection systems are not well-suited to protect mobile devices against malware attacks.

SUMMARY

One embodiment provides a system that remotely audits a security posture of a client machine at a centralized server. The system first receives a report, which includes report entries associated with security events or security states or both related to the client machine. The system then detects a pattern, which indicates a probable security attack at the client machine, among one or more reports. Next, the system classifies the security posture of the client machine based on the detected pattern.

In some embodiments, at least a part of the report is generated from one or more sources, which include: a client machine, a router, a cell phone tower, a carrier, network data from a third party, and/or any other device associated with the client machine.

In some embodiments, the system further receives a plurality of reports from a plurality of sources with each report having a common element. The system also identifies a discrepancy of the common element among the plurality of reports. The system then solves the discrepancy in accordance with a predetermined criterion.

In some embodiment, the report entries include one or more characteristics of the security events or security states or both to facilitate identification of a probable security attack at the client machine.

In some embodiments, the security events or security states associated with the report entries may include one or more of the following events:
  installing an executable file;
  opening an attachment in an email message;
  browsing a Uniform Resource Locator (URL) of a website;
  visiting an Internet Protocol (IP) address; and
  making a wireless connection.

In some embodiments, the security events or security states are associated with an application on the client machine that satisfies one of the followings:
  an application that is determined to be malicious;
  an application that is determined to have vulnerabilities;
  an application that is not permitted to install or execute under terms of service of the client machine;
  an application that potentially has a negative impact on the client machine; or
  an application that needs to be updated, replaced, or removed.

In some embodiments, the plurality of characteristics of the security events or security states may include one or more of: a local time; a time zone; a geographic location; a social network; a type of application; a user history; a device platform type; and a device configuration.

In some embodiments, the system also generates a list of secure or susceptible security events or security states, and determines whether the security events or security states associated with the report entries are present in the list.

In some embodiments, the system further detects a security event or security state that is highly correlated with the probable security attack but is not included in the list; the security event or security state may include:
  an event that occurs on the client machine more or less often than on other devices;
  receipt of an email from a sender not in a user's contact list;
  a connection attempt from an external source;
  a visit to a URL that the user does not navigate to;
  a browser redirection with an invalid field;
  an event following installation of a client application; or
  an event following refusal by the user to install the client application.

In some embodiments, the system classifies the security posture of the client machine by performing one or more of the following operations:
  classifying the client machine as being infected by malware spreading via a wireless connection, when the detected pattern shows correlation between the security events or security states associated with the report entries and a geographic characteristic as a function of time;
  classifying the client machine as being infected by malware spreading via an attachment, when the detected pattern shows correlation between the security events or security states and a social characteristic;
  classifying the client machine as being infected by a worm, when the detected pattern shows that occurrence of the security events or security states is independent of a local time characteristic;
  classifying the client machine as being infected by malware, when the detected pattern shows that the occurrence of the security events or security states is notably more frequent than a normal frequency;

classifying the client machine as being infected by malware, when the detected pattern shows a consistent inclusion of a characteristic during the security events or security states; and classifying the client machine as being infected by malware, when the detected pattern shows that the occurrence of the security events or security states is a function of a platform, an application, or a configuration.

In some embodiments, the report entry includes one or more cipher-text sections that describe the associated security event or security state or both in various degrees of details, a plaintext section that describes a general classification of the associated security event or security state or both.

In some embodiments, the client machine is also configured as a server for remotely auditing the security posture of another client machine in a hierarchic or circular architecture.

Another embodiment provides a system for facilitating remote auditing of a security posture by a centralized server at a client machine. The system receives instructions from the centralized server to report a security event. The system then calculates a validation key. Next, the system records in a report an entry associated with the security event using the validation key prior to the security event taking place at the client machine. Then, the system erases the validation key from the client machine. The system also transmits the report to the centralized server, and receives a classification of a security posture of the client machine from the centralized server.

In some embodiments, the report is downloaded to the client machine from a network. The client machine serves as a proxy to forward the report to the centralized server for auditing.

BRIEF DESCRIPTION OF THE FIGURES

FIG. 9 shows a chart describing how to classify a security posture of a client machine based on a detected pattern in accordance with an embodiment.

In the figures, like reference numerals refer to the same figure elements.

DETAILED DESCRIPTION

Figure 1:
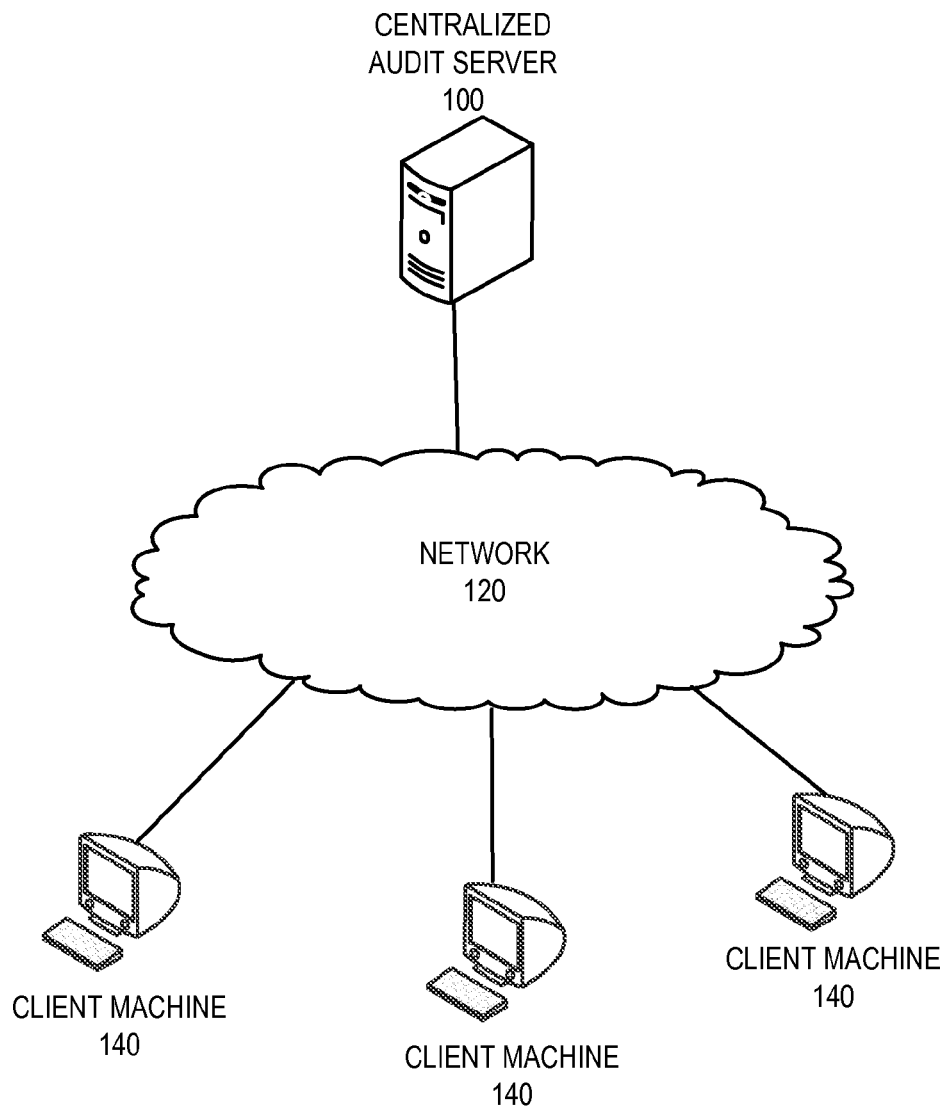
FIG. 1 shows a schematic diagram of a computing environment for remotely auditing a security posture of a client machine at a centralized server in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method and system for remotely auditing a security posture of a client machine at a centralized server in order to detect probable malware corruption. A client machine compiles an integrity-protected report of local security events or security states, with no requirement for trusted hardware, and transmits the report to a central trusted server for post-mortem detection of malware infection. In order for a report to permit accurate post-mortem analysis, security events or states that impact a client machine's security posture, e.g., installation of new application software, are reported before they take effect. Alternatively, a report may be generated from other sources, such as a router, a cell phone tower, a carrier, network data from a third party (e.g., social network data). The central trusted server can receive multiple reports from multiple sources, and determine whether the reports from different sources have discrepancy regarding a common element. If so, the central trusted server can resolve such discrepancy according to a predetermined criterion (e.g. by majority vote; by a weighted average; etc.) This procedure prevents a malicious entity from concealing infection of the client machine or other devices associated with the client machine. The central trusted server can adopt several different approaches, such as a whitelist approach, a blacklist approach, and/or a heuristic approach, to analyzing the client machine's security posture.

This centralized analysis of security events or security states not only beneficially moves the computational burden of malware detection from client side to server side, but also allows for pattern-based application classification. For example, Bluetooth or WiFi based malware has a strong geographic characteristic in terms of how it spreads, whereas installation of a system patch is likely to depend on the local time of day. Moreover, Multimedia Messaging Service (MMS) or email based malware often shows a strong correlation with a social network characteristic, while having little dependence on any geographic characteristics. A worm is likely to show explosive growth with static yield of installation, while showing little dependence on the local time of day, or on any geographical and social network characteristics. Such notable clustering of installation patterns in different malware applications and legitimate applications allows for pattern-based application classification.

The disclosed methods can apply to a wide range of infection vectors, including drive-by malware installation, exploitation of vulnerabilities in legitimate software, and so on. The disclosed method also protects against security attacks in which a user is coerced to install a legitimate program to allow a subsequent exploitation of vulnerabilities in the program, which may cause execution of an arbitrary code.

Computing Environment

FIG. 1 shows a schematic diagram of a computing environment for remotely auditing a security posture of a client machine at a centralized server in accordance with an embodiment of the present invention. In this example, the computing environment includes a centralized audit server 100, a plurality of client machines 140, and a network 120. The plurality of client machines 140 are communicatively coupled to the centralized audit server 100 via the network 120. The centralized audit server 100 can be any type of computational device capable of auditing a report from a client machine. The plurality of client machines 140 may include, but are not limited to, a laptop computer, a desktop computer, a workstation, a tablet PC, a smart phone device, a personal digital assistant (PDA), etc.

To further improve resistance against malware infection, client machines 140 may also collect and report information from multiple sources on the network. In one embodiment, at least one of the client machines 140 serves as a proxy that downloads and forwards audit reports to the centralized audit server 100. In another embodiment, network nodes at a greater distance from the client machines 140 may be used to collect and report traffic data to the centralized audit server 100. Moreover, an access point, a router or a network carrier can be audited by the centralized audit server 100 in a similar manner. For example, it is possible for a wireless access point to record URLs of visited sites, and other notable information.

During operation, a client machine 140 is installed with reporting software and also selects one or more centralized audit servers 100 as its audit servers. The selection of centralized audit server is accomplished by running a setup routine. The setup routine selects a validation key, which can be used to protect the report from being corrupted, and communicates the validation key between the client machine 140 and the audit server 100. The reporting software enables the client machine 140 to report local security events. The centralized audit server 100 can receive the report from the client machine 140, detect a pattern in the report's entries, and classify a security posture of the client machine 140 based on the detected pattern.

Figure 2A:
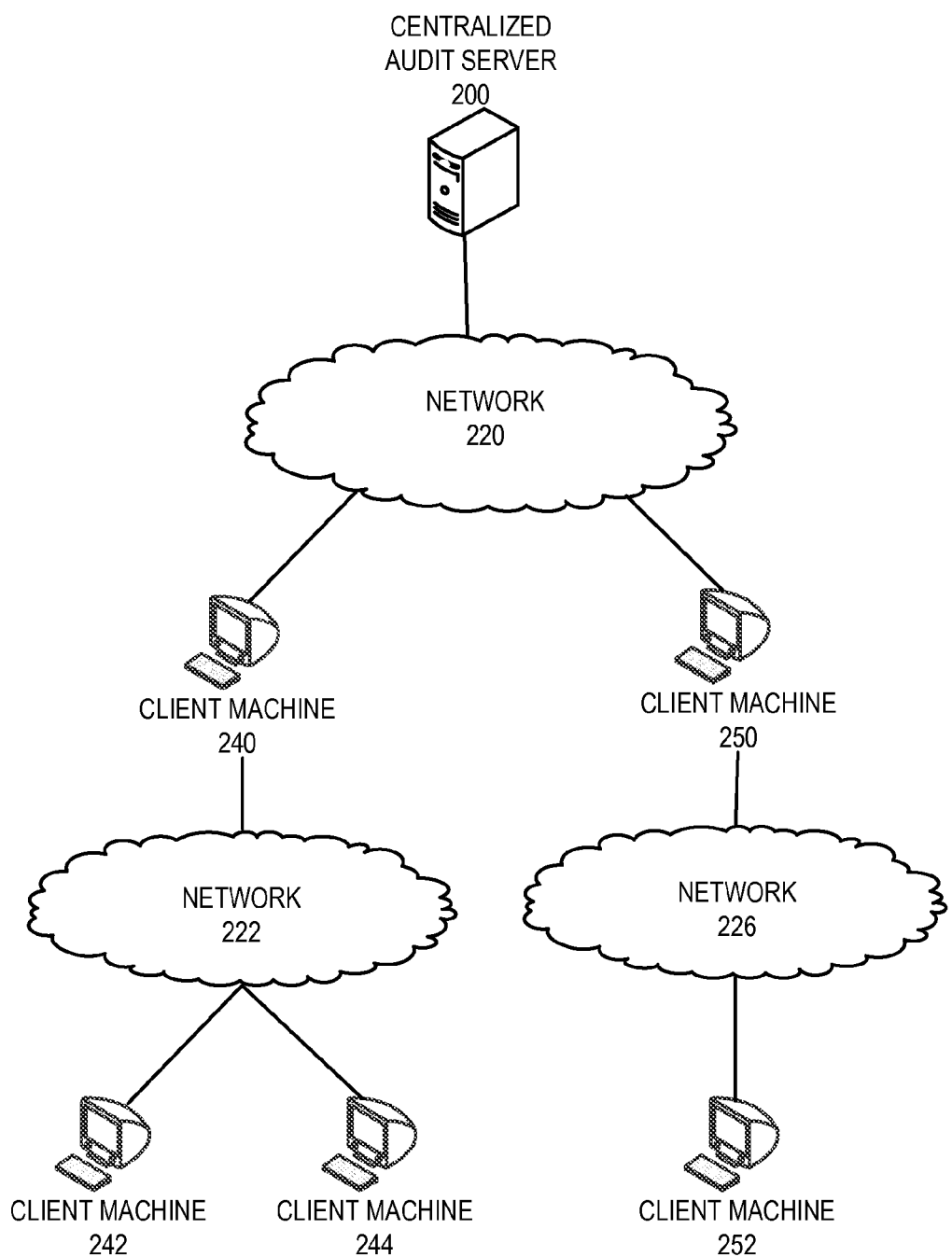
FIG. 2A shows a schematic diagram of a variation of the computing environment for remotely auditing a security posture of a client machine at a centralized server in accordance with an embodiment.

FIG. 2A shows a schematic diagram of a variation of the computing environment for remotely auditing a security posture of a client machine at a centralized server in accordance with an embodiment. In this variation, the computing environment is a hierarchic tree structure that includes a centralized audit server 200, a plurality of first-tier client machines 240 and 250, and a plurality of second-tier client machines 242, 244, and 252. The first-tier client machines 240 and 250 are communicatively coupled to the centralized audit server 200 via a network 220. The second-tier client machines 242 and 244 are communicatively coupled to the client machine 240 via a network 222, and the second-tier machine 252 is communicatively coupled to the client machine 250 via a network 226. Note that networks 220, 222 and 226 may be the same or different networks.

During operation, the centralized audit server 200 audits its child nodes, i.e., client machines 240 and 250. At the same time, the client machine 240 serves as an audit server to audit its respective child nodes, namely client machines 242 and 244. Likewise, the client machine 250 also serves as an audit server to audit its child node, client machine 252. In some embodiments of tiered auditing, the audit server 200 uses a second-order audit report transmitted from the client machines 240 and 250, and simply maintains on the audit server 200 records indicating the outcome of an audit. A second-order audit report is an audit report resulting from auditing a third party. The second-order audit report may contain only a filtered set of report entries to enhance privacy protection.

Figure 2B:
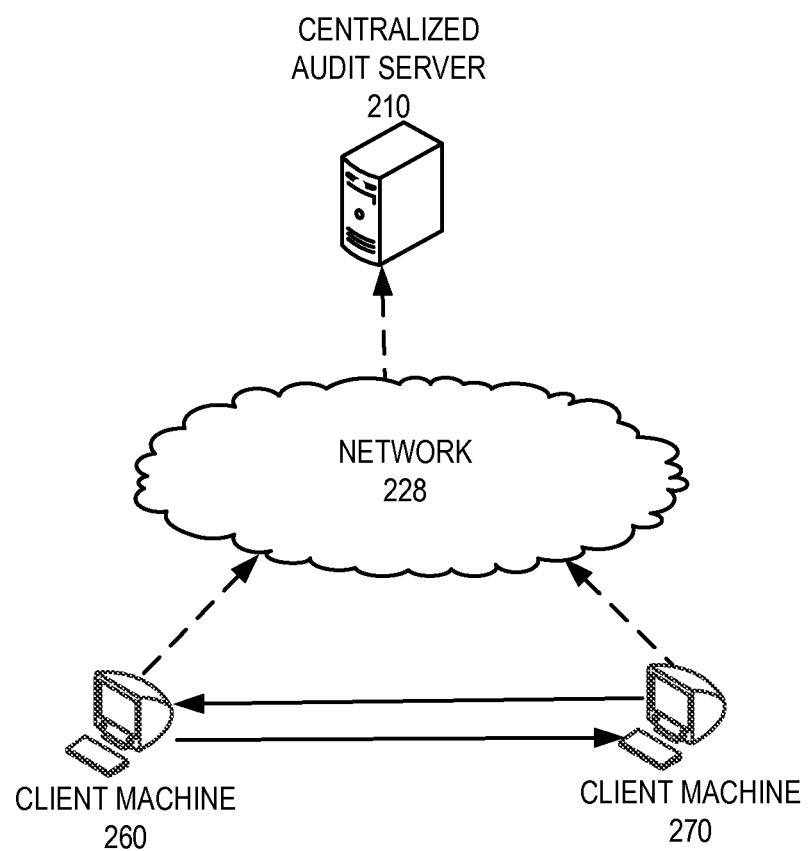
FIG. 2B shows a schematic diagram of another variation of the computing environment for remotely auditing a security posture of a client machine at a centralized server in accordance with an embodiment.

FIG. 2B shows a schematic diagram of another variation of the computing environment for remotely auditing a security posture of a client machine at a centralized server in accordance with an embodiment. In this variation, the computing environment is a circular peer structure that includes a centralized audit server 210, a pair of client machines 260 and 270, and a network 228. The client machines 260 and 270 are capable of communicating directly with each other. Moreover, the client machines 260 and 270 are communicatively coupled to the centralized audit server 210 via network 228.

During operation, client machine 260 and client machine 270 can audit each other. For example, client machine 260 can be a smart phone, whereas client machine 270 can be the computer that the smart phone synchronizes to. In some embodiments of circular auditing, only very limited audit data is transmitted between the client machines 260, 270 and the centralized audit server 210, thereby providing great privacy benefits for the client machines.

Pattern-Based Application Classification

Figure 3:
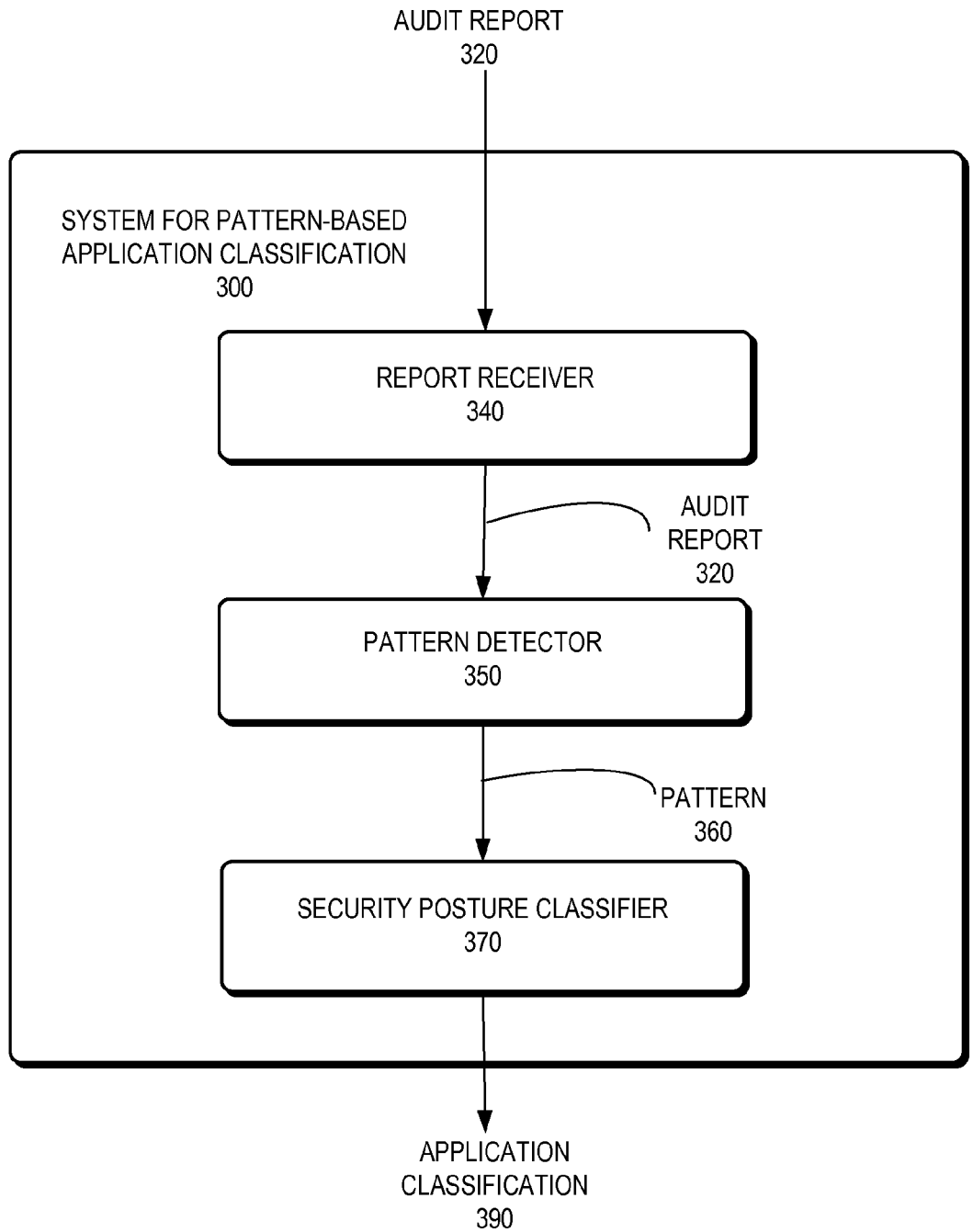
FIG. 3 shows a block diagram of a system for remotely auditing a security posture of a client machine at a centralized server in accordance with an embodiment.

FIG. 3 shows a block diagram of a system 300 for remotely auditing a security posture of a client machine at a centralized server by using pattern-based application classification in accordance with an embodiment. System 300 includes a report receiver 340, a pattern detector 350, and a security posture classifier 370.

Report receiver 340 receives an audit report 320 from a client machine via a network, and can be a network port, a wireless receiver, a radio receiver, a media receiver, etc., without any limitations. Audit report 320 may be generated locally at a client machine, or collected from a network node such as an access point, a router, a cell phone tower, a network carrier, network data from a third party, or another device associated with the client machine. Audit report 320 includes report entries associated with security events or security states or both related to the client machine or over the network. Each report entry is protected from corruption and comprises a plurality of characteristics of the security events or security states, e.g., local time, geographic location, social network, user history, etc. A security event is an occurrence in a system, at a time point, that is relevant to the security of the system. A security state, on the other hand, is an occurrence relevant to the security of the system for which the time point cannot be determined or predicted. Report receiver 340 then passes audit report 320 to pattern detector 350 for processing.

Pattern detector 350 can be any computing device or module with a detection mechanism capable of detecting a pattern from the audit report. The installation and execution of malware or legitimate software applications can be described in terms of such characteristics as local time, time zone, geographic location, social network of user, apparent type of application, user history, etc. Different types of software applications exhibit very distinct patterns in at least one characteristic. Pattern detector 350 analyzes entries in one or more audit reports 320, and looks for distinct patterns 360 shown in the report entries. For example, the report entries may show that all installations of an application have high yields on a particular platform configuration. If a distinct pattern 360 is recognized from the audit report 320, the pattern detector 350 sends the detected pattern 360 to security posture classifier 370.

Security posture classifier 370 can be any computing device or module with a classification mechanism capable of classifying an application based on a detected pattern. Security posture classifier 370 receives from pattern detector 350 a detected pattern 360 in at least one characteristic associated with security events or security states related to the client machine. Security posture classifier 370 then determines an application classification based on the detected pattern 360. For example, security posture classifier 370 may determine a software application to be malware using Bluetooth or WiFi to spread if the detected pattern 360 shows a strong geographic correlation as a function of time. Likewise, security posture classifier 370 may determine an application to be a worm if the detected pattern 360 shows that activities of the application occur in burst and are independent of the local time. Upon determining the application classification 390, the security posture classifier 370 outputs the application classification 390 such that proper actions can be taken.

Figure 4:
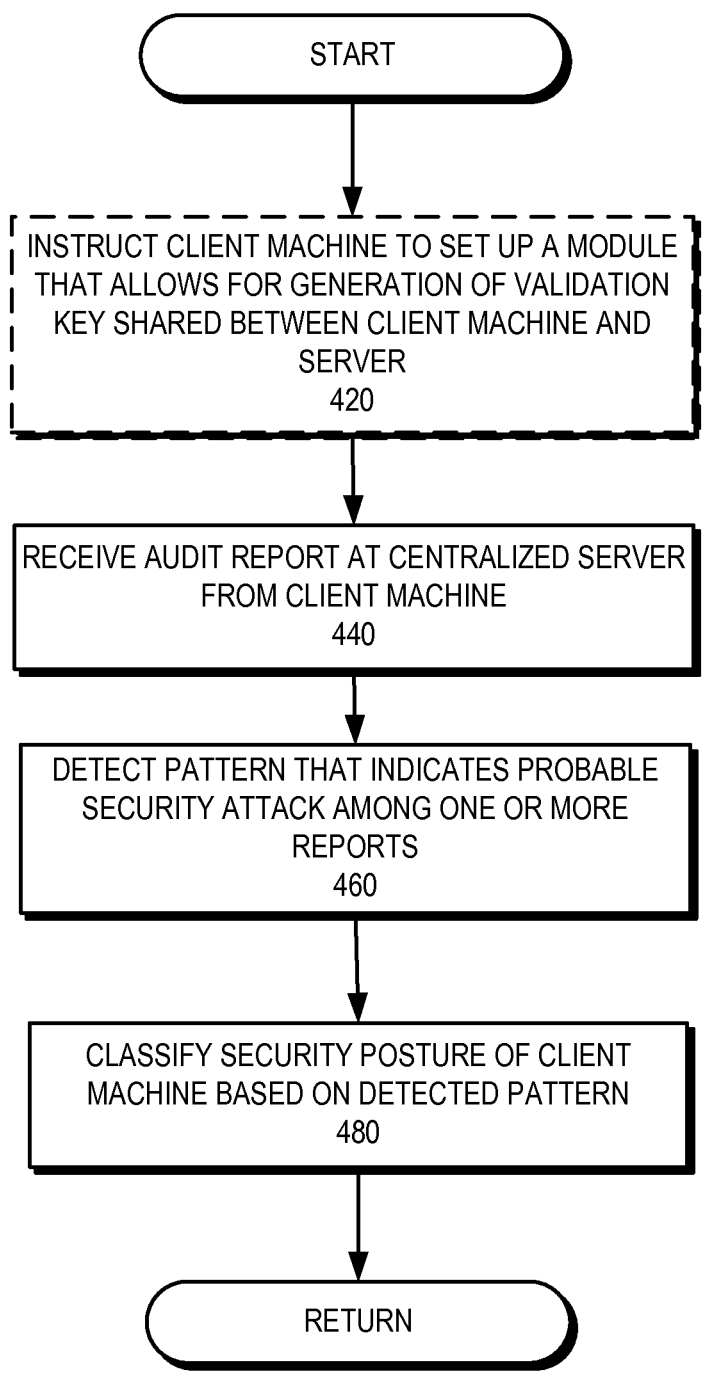
FIG. 4 shows a flow chart illustrating a method for remotely auditing a security posture of a client machine at a centralized server in accordance with an embodiment.

FIG. 4 shows a flow chart illustrating a method for remotely auditing a security posture of a client machine at a centralized server in accordance with an embodiment.

During operation, the system receives an audit report from a client machine (operation 440). In a preferred embodiment, prior to receiving the audit report, the client machine is instructed by the audit server to set up a reporting module or software (operation 420). The reporting module or software generates validation keys to be shared between the client machine and the centralized audit server, such that the audit report is integrity-protected and cannot be modified or staged by any malicious programming code. The audit report contains report entries associated with security events or security states, which may indicate a probable security attack at the client machine. The report entries include a plurality of characteristics of the security events or security states, ranging from local time, and geographic location to device platform and configurations.

Next, the system determines whether the report entries of the audit report show any distinct pattern that indicates a probable security attack (operation 460). In some embodiments, such pattern is detected in one particular characteristic. In other embodiments, a distinct pattern is detected only when different dimensions or multiple characteristics are considered in combination. In some embodiments, a distinct pattern is detected among one or more reports collected from different sources. Finally, the system classifies a security posture of a client machine based on the detected pattern (operation 480). Generally, an adversary can corrupt a client machine through three separate avenues: (1) the adversary can coerce a user to install malware on a client machine; (2) the adversary can exploit a vulnerability in a piece of benevolent software running on the client machine; and (3) the adversary can first coerce a user to install benevolent software with a vulnerability and later exploit this vulnerability. Thus, broadly speaking, software can be classified into at least three types: malware, benevolent software known to have vulnerabilities, and benevolent software not known to have vulnerabilities. Here, the term "software" is used to broadly include operating system code and routines, firmware, and other static code, as well as all user-installed applications. The classification above is merely one of many possible ways to classify software applications. It is not intended to be exhaustive or to limit the present invention to the forms disclosed. The software applications can be further classified at a greater granularity based on varying levels of pattern matching.

Event Reporting

Figure 5:
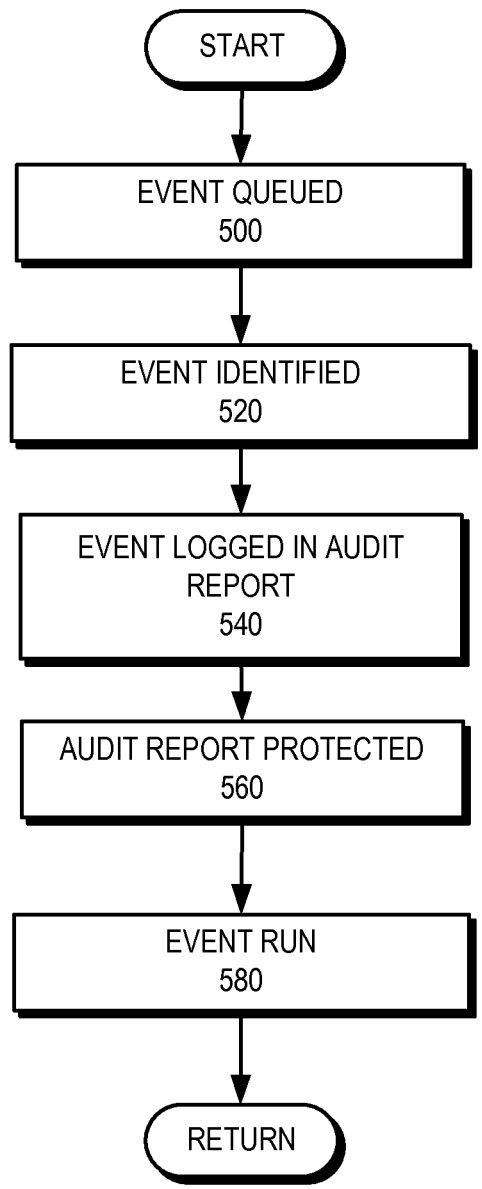
FIG. 5 shows a flow chart illustrating a method for facilitating remote auditing of a security posture by a centralized server at a client machine in accordance with an embodiment.

FIG. 5 shows a flow chart illustrating a method for facilitating remote auditing of a security posture by a centralized audit server at a client machine in accordance with an embodiment. Preferably, before a security event takes place at the client machine, the reporting software has been installed on the client machine, which allows the client machine to select one or more audit servers. The selection of audit servers involves running, either on the client machine or on the selected audit servers, a setup routine in which a validation key is selected and communicated between the client machine and the audit servers.

During operation, the system queues one or more security events (operation 500). Then, the system identifies a security event to be executed next in queue (operation 520). Next, the system calls a report routine to report the identified security event in an audit report (operation 540). Note that the security event is recorded before the client machine allows the security event to take place. This order is crucial, because if the security event were allowed to take place prior to being reported and the event involved malware infection, then the audit mechanism could be subverted. Thus, it is important that the system protects the audit report using validation keys (operation 560) before the security event is allowed to run on the client machine (operation 580). In one embodiment, the system protects the audit report using a symmetric key construction. In another embodiment, the system protects the audit report using an asymmetric key construction.

Figure 6:
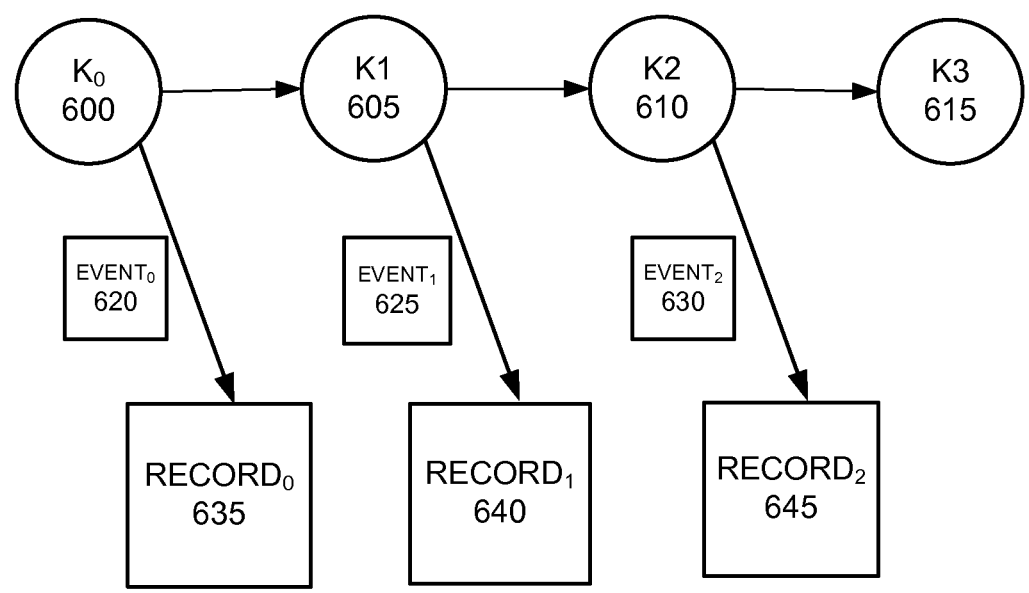
FIG. 6 shows a flow chart illustrating a method for reporting security events or security states or both using validation keys at a client machine in accordance with an embodiment.

FIG. 6 shows a flow chart illustrating a method for reporting security events using validation keys at a client machine in accordance with an embodiment. In this example, a first validation key $K_0$ 600 is generated to encrypt a report entry $Record_0$ 635, which is associated with $Event_0$ 620, in the audit report. After the report entry $Record_0$ 635 is recorded, the first validation key $K_0$ is erased from the client machine. The key generation algorithm subsequently generates a second validation key $K_1$ 605. The system uses $K_1$ 605 to encrypt report entry $Record_1$ 640, which is associated with a second security event $Event_1$ 625 taking place at the client machine. The validation key $K_1$ 605 is erased from the client machine after the $Record_1$ 640 is created. Similarly, for a later event $Event_2$ 630, the same key generation algorithm generates a third validation key $K_2$ 610 for encrypting a report entry $Record_2$ 645, which is associated with $Event_2$ 630. After $Record_2$ 645 is created, the third validation key $K_2$ 610 is erased from the client machine, and the system generates another validation key $K_3$ 615 in preparation for an upcoming event. Therefore, for each report entry recorded in the audit report, a new key is computed and the old key is erased. Since events are reported before they are allowed to take place, the attackers cannot modify the reported records, because the key needed to compute this record has already been erased by the time the event is executed on the client machine.

The schema shown in FIG. 6 can be implemented in either a symmetric construction or an asymmetric construction. In a symmetric construction, the system maintains a cryptographic hash function $$h: Z^* \to \{0,1\}^l$$

and a message authentication function MAC. In one embodiment, the message authentication function MAC can be constructed from a hash function. In one embodiment, the system also maintains a key-verification value $c_i$, which can be used to prove that a key $k_i$ is current without revealing the value of the key $k_i$. Next, the system calls to the function setup(1)$\to K_0$ to compute $K_0 = (c_0 = \bot, k_0)$, where $$k_0 \xleftarrow{R} \{0,1\}^l.$$

The function setup can be executed either by an audit server or by a client machine. Once generated, $K_0$ is securely transmitted to the other party. The client machine then sets an internal counter $i \leftarrow 0$.

To log event $\epsilon_i$, the system calls to the function $$\log(\Gamma_{i-1}, K_{i-1}, \epsilon_i) \to (\Gamma_i, K_i),$$

which computes $\mu_i = MAC_{k_i}(0 \| \epsilon_i)$, sets $\Gamma_i \leftarrow \Gamma_{i-1} \| (\epsilon_i, \mu_i)$ and $K_i = (c_i, k_i)$, where $k_i \leftarrow h(k_{i-1})$ and $c_i \leftarrow MAC_{k_i}(1)$. The system then erases $K_{i-1}$ by overwriting the corresponding cells. The client machine increments the internal counter value i.

When the audit server wishes to audit the client machine, it requests $(\Gamma, c)$, that is, the current audit report and the key-verification value c, from the client machine. In a preferred embodiment, the audit report and key-verification value are sent to the audit server from the client machine through a secure channel to prevent rollback attacks. The system calls to the function $$\text{audit}(\Gamma, K_0) \to \{0,1\},$$

which extracts a counter value i from $\Gamma$ by counting the number of report entries. The audit function also computes $k_j$ for all $j \le i$ and verifies all corresponding MACs in $\Gamma$. In addition, the audit function can verify that $c = h(1, k_i)$. If all verifications are valid, the audit function outputs '1;' otherwise, it outputs '0.'

In an asymmetric construction of the auditing mechanism described in FIG. 6, the system can use a forward-secure signature (FSS) scheme. An FSS scheme is a scheme that uses a fixed public key, but updates a secret signing key at regular intervals so as to provide a forward security property. That is, the compromise of a current secret key does not enable an adversary to forge signatures pertaining to the past. FSS is known as a useful way to mitigate damages caused by key exposure without requiring distribution of keys. The reporting operation corresponds to producing a signature and evolving a secret key. The key-validation value c can be represented as a one-way function of the secret key from the previous epoch or as a portion of the current secret key. Similar to the symmetric construction, old instances of c are erased along with old instances of the secret key. Note that, because all audits are performed over encrypted channels, the value c is never revealed to an attacker, thereby enabling enhanced network security.

The audit operation in the asymmetric construction involves verification of an uninterrupted series of signatures from the FSS scheme, starting with the signature associated with the first time period of the FSS scheme, and ending with the signature associated with the key-validation value.

Figure 7:
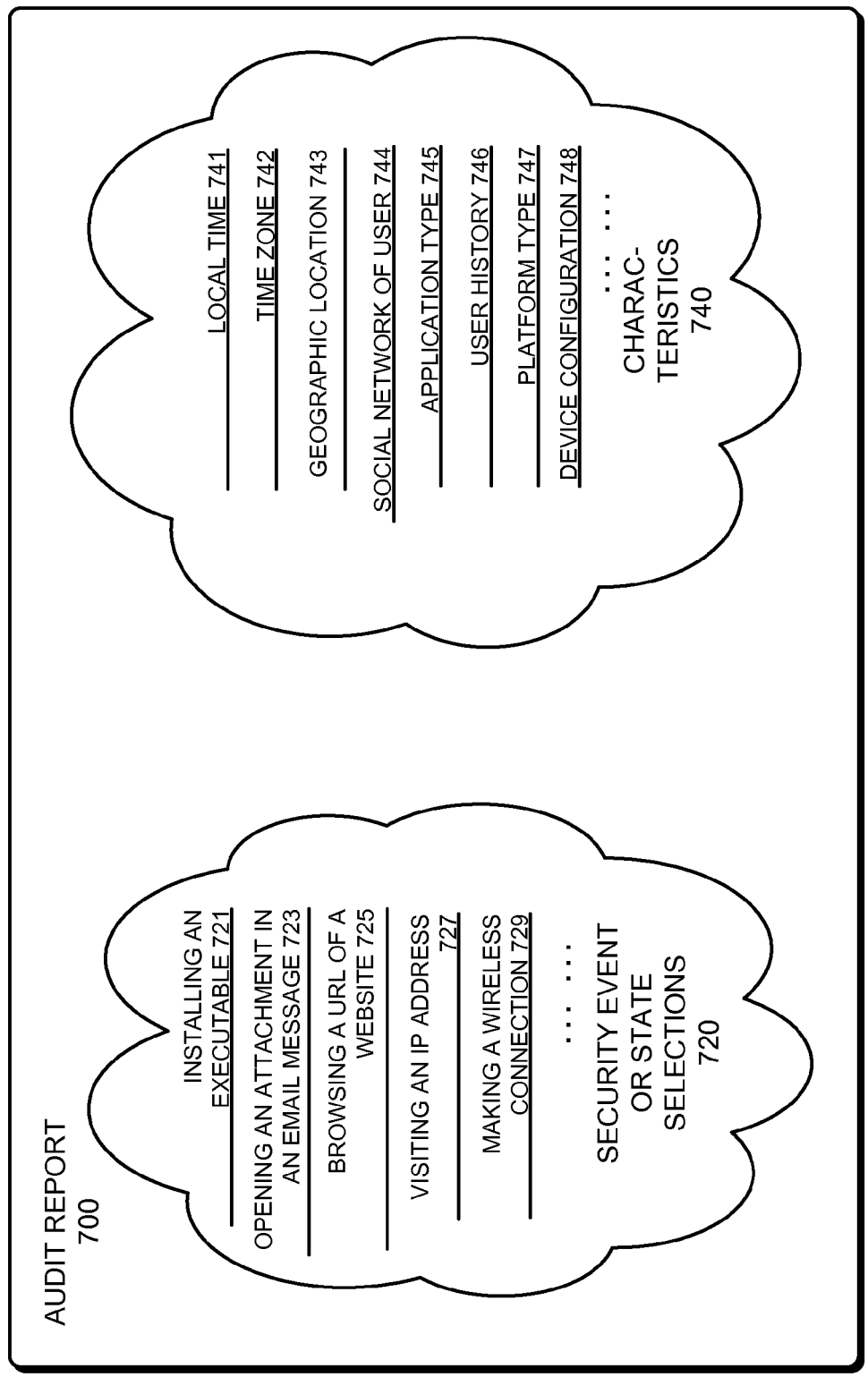
FIG. 7 shows a diagram of an audit report in accordance with an embodiment.

FIG. 7 shows a diagram of an audit report 700 in accordance with one embodiment. One of the most important decisions to be made is what security events or security states should be placed in the audit report 700 in support of the security posture assessment of the client machine. The goal is to record a broad enough range of event/state types to ensure capture of indicators of malware infection for a substantial fraction of attacks. At the same time, it is desirable that the reporting process be efficient, both in terms of computational overhead and the size of the audit report 700.

Accordingly, security event or state selections 720 list some security events or security states with the highest ratio of detection efficacy to reporting cost. Those security events or security states include, but are not limited to:

(1) Installing an Executable 721.

A common means of malware infection is through direct installation by a deceived user. In order to effectively fingerprint the installation of an executable, and depending on the auditing and evaluation method, the system may choose to report a file hash, a current signature for file fingerprinting, the URL or IP address of the origin of the executable, or even the entire binary in special cases.

(2) Opening an Attachment in an Email Message 723.

Another frequent means of malware infection is through executables in an email attachment. Since an attacker can easily modify executables and sender names for individual users, executable contents and sender names are not ideal for reporting in this scenario. The system may choose to report the routing history of the message instead.

(3) Browsing a URL of a Website 725.

A drive-by download is a program that is automatically downloaded to a client machine without a user's informed consent. Drive-by download attacks typically are initiated simply by browsing a URL of a website. With a less restrictive security setting, it may be possible for drive-by downloads to occur without any further action by the user. Sometimes a drive-by download is installed along with a legitimate user-requested application. For this type of event, the system may choose to record browsing history in the audit report.

(4) Visiting an IP Address 727.

Similar to browsing a URL of a website, visiting an IP address can also lead to drive-by download attacks. Thus, the system may choose to record a history of visited IP addresses for this type of security event.

(5) Making a Wireless Connection 729.

Local connections, whether WiFi or Bluetooth, also pose a potential threat for malware infection. The local connections may cause slow but inconsistent spread of malware, because it is difficult to monitor the connections from the backbone. Hence, detailed traffic analysis based on connection information is needed to identify patterns indicative of epidemics. Therefore, the system may choose to report an instance of local wireless connection, along with location information or other identifying data, for this type of security event.

The security event or state selections 720 listed in FIG. 7 are examples only. They are not intended to be exhaustive or to limit the present invention to the forms disclosed. An audit report 700 may contain additional security events or security states that are not listed. Likewise, an audit report 700 may include a subset of the security event or state selections 720.

In addition, it may be helpful to record data that does not directly allow for identification of infection attempts in order to use anomaly detection as an early-warning system. Such data include, but are not limited to, for example, approximate geographic location, and whether an attachment was received from a contact from a user's address book. Since some of the data may negatively affect the user's privacy, special care is optimally taken to strike an appropriate balance between security and privacy.

In sum, the security event or state selections 720 can be described in a variety of different characteristics 740, e.g., a local time 741, a time zone 742, a geographic location 743, a social network of a user 744, an application type 745, a user history 746, a platform type 747, a device configuration 748, etc. The characteristics 740 listed above are examples only. They are not intended to be exhaustive or to limit the present invention to the forms disclosed. An audit report 700 may describe a security event or security state using a characteristic that is not listed. Also, an audit report 700 may use a combination of different characteristics 740 listed in FIG. 7.

Pattern-Based Anomaly Detection

FIGS. 8A-D show diagrams of sample pattern detected among one or more reports indicating a probable security attack in at least one characteristic of the security events or security states in accordance with embodiments of the present invention.

Figure 8A:
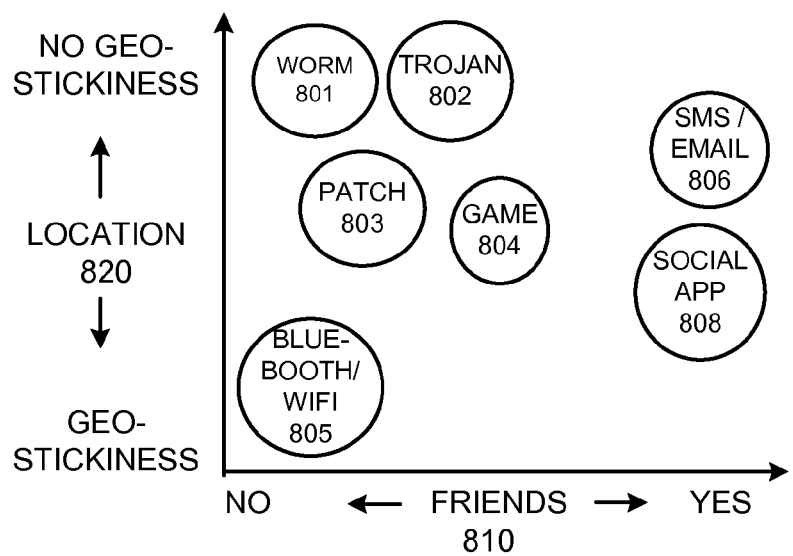
FIG. 8A shows a diagram of a sample pattern detected among one or more reports indicating a probable security attack in at least one characteristic of the security events or security states in accordance with an embodiment.

FIG. 8A shows a pattern exhibited by different types of malware and legitimate applications in relation to social network friendships 810 and geographic locations 820. In this diagram, the x-axis represents whether the installation of an application correlates to social network friendships 810. Thus, a large x-coordinate corresponds to an installation that is likely to spread via friend invitations or messages from friends, whereas a small x-coordinate indicates that the installation of an application is unlikely to be initiated via a friend invitation or message. On the other hand, the y-axis represents whether the installation of an application correlates to a geographic location. A large y-coordinate indicates that the spreading of an application is not limited to any particular geographic location, whereas a small y-coordinate means that the installations of the application tend to occur in geographically nearby client machines.

When considering the characteristics of social friendships and geographic locations together, the system can detect that different types of malware or applications exhibit different patterns in these characteristics, and that they tend to cluster at different areas in this diagram. For example, malware spreading through SMS and emails 806 and malware spreading through social applications 808 tend to show a strong correlation with social friendships and are typically independent of geographic locations. Malware spreading through Bluetooth or WiFi 805 shows little correlation with social friendship and a strong correlation with geographic locations at the mean time. Also, worms 801 and Trojans 802 show little geographic stickiness and little correlation with social friendships. Finally, legitimate applications such as patches 803 and games 804 tend to cluster in the middle range of the x- and y-coordinates. Therefore, by studying installations of applications in relation to social network friendships 810 and geographic locations 820, the system observes different patterns in the installations of different applications.

Figure 8B:
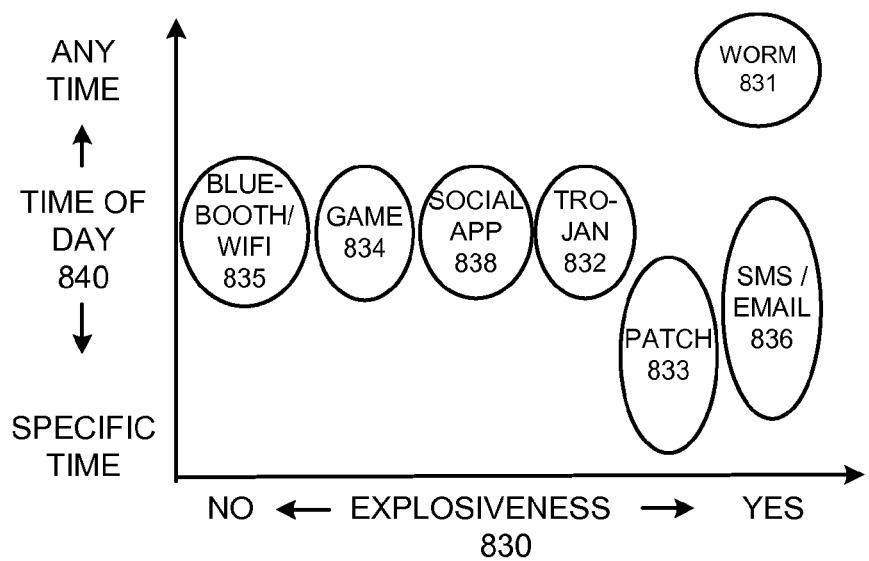
FIG. 8B shows a diagram of a sample pattern detected among one or more reports indicating a probable security attack in at least one characteristic of the security events or security states in accordance with an embodiment.

FIG. 8B shows a pattern exhibited by different types of malware and legitimate applications in relation to explosiveness of the number of installations 830 and time of day 840. In this diagram, the x-axis represents whether the installation of an application has an explosive number of instances 830. A large x-coordinate corresponds to an explosive number of installations, whereas a small x-coordinate means the installation does not occur in an explosive manner. On the other hand, the y-axis represents whether the installation of an application correlates to the time of day 840. A large y-coordinate indicates that the installations of an application can occur at any time of day, whereas a small y-coordinate means that the installations of the application tend to occur during a specific time period of the day.

When considering the characteristics of explosiveness of the number of installations and time of day together, the system can detect that different types of malware or applications exhibit different patterns in these characteristics, and that they tend to cluster at different areas in this diagram. For example, malware spreading through SMS and emails 836 and legitimate software patches 833, albeit with an explosive number of installations, tend to get installed during waking hours. In contrast, worms 831, which also show an explosive number of installations, can be installed on a client machine during any time of day. Malware spreading through Bluetooth or WiFi 835 or through social applications 838, as well as Trojans 832 and legitimate games 834, do not show any remarkable correlation with time of day. Neither do they have an explosively high number of installations. Therefore, by studying installations of applications in relation to explosiveness of the installations 830 and time of the day 840, the system can also observe different patterns in the installations of different applications.

Figure 8C:
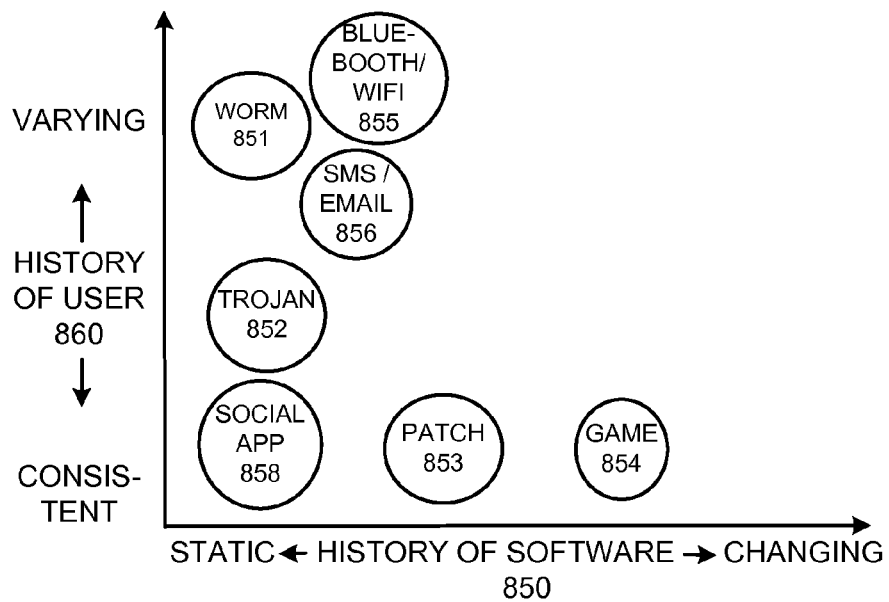
FIG. 8C shows a diagram of a sample pattern detected among one or more reports indicating a probable security attack in at least one characteristic of the security events or security states in accordance with an embodiment.

FIG. 8C shows a pattern exhibited by different types of malware and legitimate applications in relation to the history of software 850 and the history of user 860. In this diagram, the x-axis represents whether the history of an application installation 850 is showing a static or changing manner. Thus, a large x-coordinate corresponds to an installation that is likely to change from time to time, whereas a small x-coordinate indicates that the installation of an application is static. On the other hand, the y-axis in this diagram represents whether the history of the user is static or varying 860. A large y-coordinate indicates that the user's behavior during an installation varies from time to time, whereas a small y-coordinate means that the user's behavior during installations of the application tend to be consistent.

When considering the characteristics of history of software 850 and history of user 860 together, the system can detect that different types of malware or applications exhibit different patterns in these characteristics, and that they tend to cluster at different areas in this diagram. For example, worms 851, Trojans 852, and malware (including those spreading via Bluetooth or WiFi 855, via SMS or emails 856, or via social applications 858) typically behave in a very static manner. If they spread using a user's address book, they almost always use the user's address book. Likewise, if they spread via a wireless connection, they almost always use a wireless connection. By contrast, installations of legitimate software applications, such as patches 853 and games 854, usually do not show any fixed patterns. Moreover, for legitimate applications, such as patches 853 and games 854, and some malware (e.g., those spreading via a social application 858), a user typically takes consistent actions during the installation and makes consistent choices at the user's own will. In contrast, a user's behavior during the installation of a worm 851, a Trojan 852, and malware spreading via Bluetooth/WiFi 855 or via SMS/emails 856, usually varies from time to time. This is especially true when a malware author uses polymorphic code that changes itself as it spreads from one client machine to another client machine. Therefore, by studying installations of applications in relation to the history of software 850 and the history of user 860, the system observes different patterns in the installation of different applications.

Figure 8D:
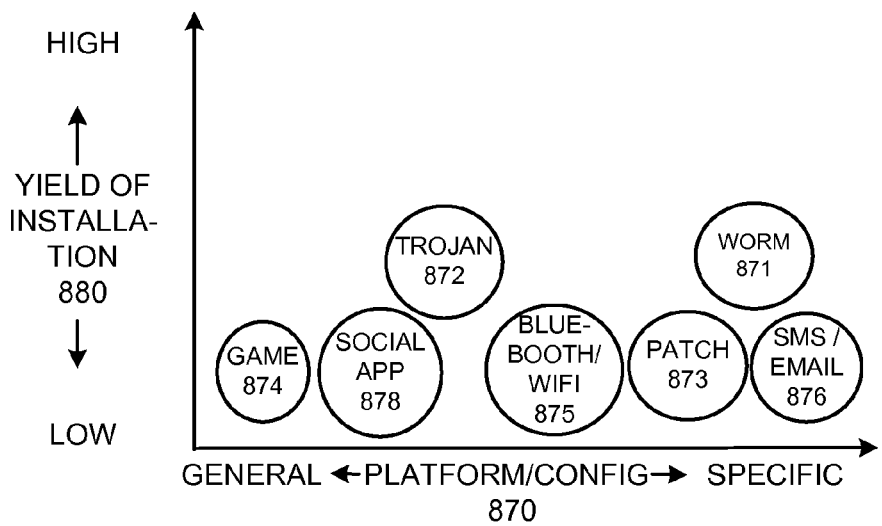
FIG. 8D shows a diagram of a sample pattern detected among one or more reports indicating a probable security attack in at least one characteristic of the security events or security states in accordance with an embodiment.

FIG. 8D shows a pattern exhibited by different types of malware and legitimate applications in relation to device platform and/or configurations 870 and yield of installation 880. In this diagram, the x-axis represents whether the installation of an application is specific to a particular device platform and/or configuration 870. A large x-coordinate indicates that the installations of an application are specific to a particular device platform or configuration, whereas a small x-coordinate means that the installations of the application are generally applicable to most device platforms and configurations. On the other hand, the y-axis represents the yield of installation 880. Here, the term "yield" is used to measure the likelihood that a client machine, which could become infected, actually does become infected. Thus, a large y-coordinate corresponds to a high yield of installation, whereas a small y-coordinate indicates a low yield of installation.

When considering the characteristics of platform/configurations 870 and yields of installation 880 together, the system can detect that different types of malware or applications exhibit different patterns in these characteristics, and that they tend to cluster at different areas in this diagram. For legitimate software applications, chances are that a user who installs an application decides to do so. Therefore, legitimate applications, such as patches 873 and games 874, often are associated with low yields. In contrast, worms 871 and Trojans 872 often are associated with high yields. Other malware, whether spreading through Bluetooth/WiFi 875, social applications 878, or SMS/emails 876, may not show a remarkably high yield because a user has a better opportunity to refuse installing those applications. However, they could show a distinguishable pattern in relation to device platform and configuration. Most legitimate applications (except for patches 873) are not specific to a platform or a configuration. In contrast, malware applications often are specific to a particular platform and/or configuration. Therefore, by studying installations of applications in relation to device platform and configuration 870 and yield of installation 880, the system can also observe different patterns in the installations of different applications.

Hence, different types of malware or legitimate applications tend to show distinct patterns in different dimensions of characteristics. The examples given in FIGS. 8A-D are briefly summarized by types of applications below:

Bluetooth and WiFi based malware infections: highly correlated with a specific geographic location; highly correlated with local time of day; social network data and communication history of relatively low importance; often spreading slowly with stable and high yield; etc.

MMS and email based malware infections: little correlation with geographic location; highly correlated to social network data, local time of day, and communication history; typically explosive spread with stable and high yield; etc.

Worms: little correlation with geographic location, local time of day, or social network data; likely explosive spread with static yield; etc.

Trojans: little correlation with geographic location; highly correlated with social network data and local time of day; etc.

Patches: relevant to local time of day; some dependence on social network data; likely dependent upon organizational structure; possibly explosive number of installations within a short period of time; etc.

Games: relevant to local time of day, and historical yield of installation; geographic location somewhat important; communication history of importance; likely clustering of similar behavior among contacts that are friends of a user; likely showing slow but bursty installation behavior; etc.

Note that FIGS. 8A-D are merely a few examples illustrating how to identify a distinct pattern based on the notable clusters shown by different applications in one or more characteristics. The patterns detected by the disclosed system by no means are limited to these characteristics and/or applications.

Evaluating Client Security Posture

The audit function described above can provide an audit server with a highly probable indication of client-side infection in cases where the audit server detects a corruption in the audit report. However, scanning an intact (or non-corrupted) report for evidence of malware infection is challenging. Basically, there are three different approaches to server-side identification of client machine infections.

(1) Whitelisting.

Whitelisting can be useful in paring down a report to enable a focused analysis of potentially susceptible events, and to identify the utilization of benevolent programs with known vulnerabilities. In a whitelisting approach, an audit server refers to a list of executables and/or client behaviors, which are believed to be safe and secure. The whitelist policy dictates what type of security events and/or characteristics should be reported by a client machine. Various applications may require different data to be reported. Because some benevolent applications may be known or suspected to have vulnerabilities, it is vital to collect information that allows the audit server to determine whether the invocation of a piece of software on the whitelist corresponds to an infection. In some embodiments, an audit server would only classify a security posture of a client machine as secure if the audit report contains exclusively security events ore security states that are present in the whitelist.

(2) Blacklisting.

In a blacklisting approach, the audit server refers to a list of executables and/or client behaviors, which are known to induce (or suspected of inducing) client-side vulnerabilities. In some embodiments, the audit server would only classify a security posture of a client machine as secure if the audit report contains no security events and security states that are present in the blacklist. Examples of blacklists present on client machines include the signature file of an anti-virus filter and the list of offending websites present in some browsers.

(3) Heuristics.

As the scope of security events or security states in the audit report grows, many security events or security states may become ambiguous, subject only to probabilistic analysis, or analysis in a large context. Heuristics may be used to analyze security events or security states that are highly correlated with malware infection, even if they cannot be identified as installation or execution. For example, a user who frequently visits online gambling sites may be at higher risk for infection—a fact useful for an audit server to know in its assessment of the security posture of the client machine. However, visiting a class of sites is not a clear indication that a client machine actually has been infected with malware.

In some embodiments, useful heuristics can include receipt of an email message from a person not in the list of contacts; any connection attempt from an external source; visits to URLs that the user did not navigate to (e.g., iframes); browser redirection with an invalid or missing REFERER field; any event following the installation of software and within the same session; any installation following a refusal by the user to install a piece of software and within the same session; and any other uncommon events. The most useful heuristic analysis typically takes into consideration several concurrent dimensions of characteristics that are used to describe an installation or execution of an application.

FIG. 9 shows a chart describing how to classify a security posture of a client machine based on a detected pattern using one or more of the above described approaches in accordance with one embodiment. The first column of the chart lists some examples of detected patterns 900. The second column shows the corresponding classification of the application 950. For example, if an audit server detects correlation between the security events or security states and a geographic characteristic as a function of time, the audit server may classify the application as malware spreading via a wireless connection. If the audit server detects correlation between the security events or security states and a characteristic related to social network data, the audit server might classify the application as malware spreading via attachments. If the audit server detects that the occurrence of the security events or security states is independent of local time, the audit server may classify the application as a worm. If the audit server detects an occurrence of the security events or security states at a notably more than normal frequency, the audit server may classify the application as malware. If the audit server detects a consistent inclusion of a characteristic during the security events or security states, the audit server may classify the application as malware. If the audit server detects that the occurrence of the security events or security states is a function of platform, application, or configuration, the audit server might classify the application as malware.

This list of FIG. 9 is extendable. The rows in FIG. 9 are merely a few examples of many possible ways to classify software applications based on patterns in different characteristics. It is not intended to be exhaustive or to limit the present invention to the forms disclosed. Note that the audit server may classify the applications at different granular levels. In some embodiments, the applications are classified at a general level, e.g., malware vs. legitimate applications. In other embodiments, the applications are classified at a detailed level, e.g., worms, Trojans, or malware. In yet another embodiment, a classification can be sub-classified, e.g., malware may further be classified based on its means of spreading (whether via a wireless connection, or social network applications, or email attachments, etc.).

Privacy Enhancements

In order to strike an appropriate balance between security and privacy, a few privacy enhancements of the system can be implemented to limit the expressiveness of the data reported back during an audit. One way to enhance the privacy protection of the disclosed system is by replacing the security event or security state to be recorded with one or more cipher-texts describing the security event or security state in various degrees of details, or a more general classification of the event in plaintext format, or both. In one embodiment, the cipher-text encryption is probabilistic to avoid analysis based on the small message space, and has the common property that it commits to the plaintext to avoid "bait-and-switch" versions of rollback attacks. In rollback attacks, a malware agent de-commits to a security event other than what has taken place. Depending on the expressiveness of the various classifications, different trade-offs between privacy and security can be made.

Another privacy-enhancing approach involves a tiered audit, whether hierarchical or circular, as discussed above in relation to FIGS. 2A-B. In a tiered audit, the auditing node optimally maintains only records indicating the audit outcome, using an independent second-order audit report. The second-order audit report is a report that will be audited by a third party. For example, in FIG. 2A, an example of a circular audit in which two peer nodes audit each other is given. The resulting audit reports are then audited by a third party, i.e., the audit server. Tiered audit can be structured in a way that enhances privacy, since the second-order report contains only a filtered set of entries.

Apparatus for Remotely Auditing Security Posture of Client Machine

Figure 10:
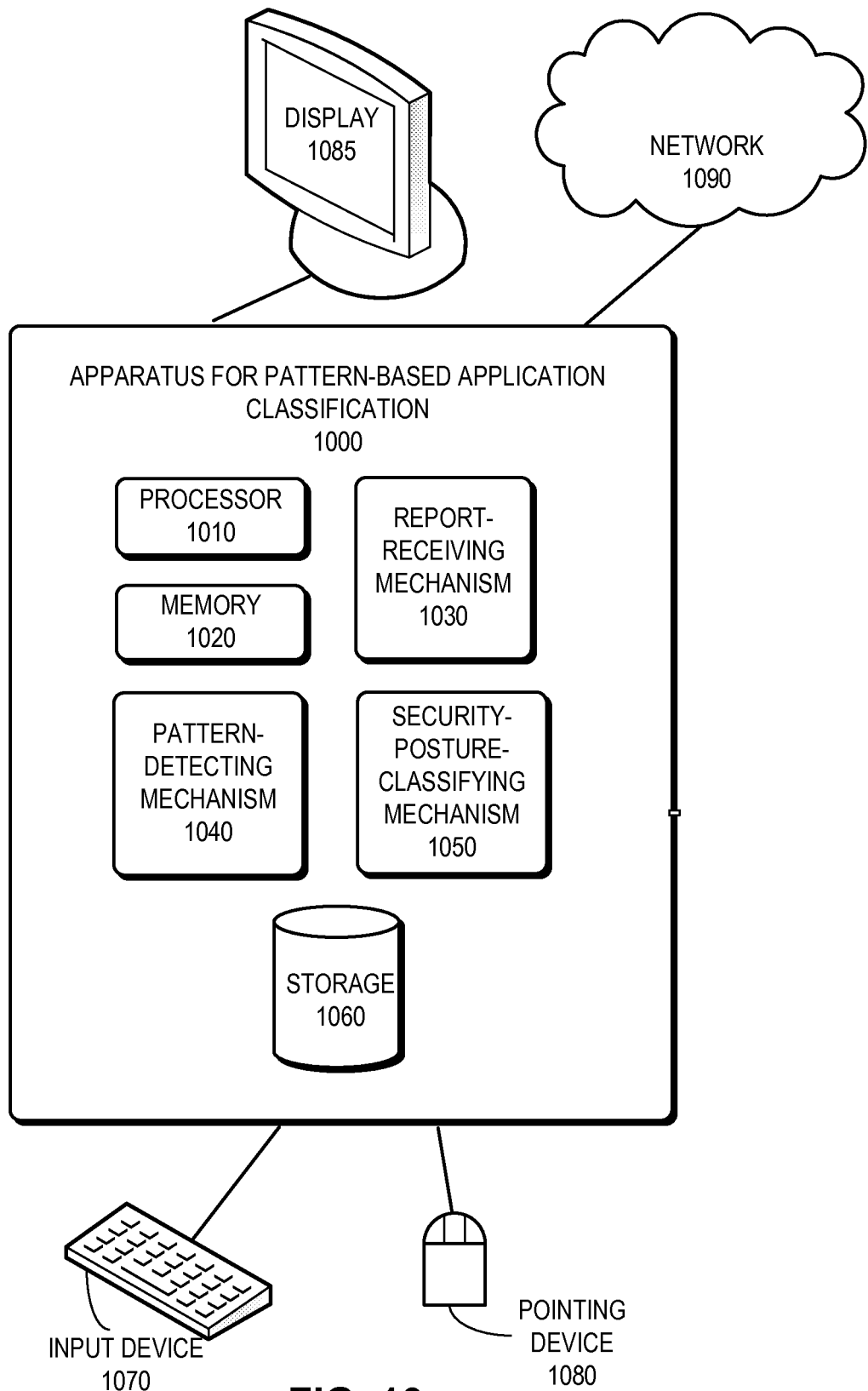
FIG. 10 shows a block diagram of an apparatus for remotely auditing a security posture of a client machine at a centralized server in accordance with an embodiment.

FIG. 10 shows a block diagram of an apparatus for remotely auditing a security posture of a client machine at a centralized server in accordance with an embodiment. The apparatus 1000 includes a processor 1010, a memory 1020, a report-receiving mechanism 1030, a pattern-detecting mechanism 1040, a security-posture-classifying mechanism 1050, and storage 1060. The apparatus 1000 can be coupled with a display 1085, a network 1090, an input device 1070 and a pointing device 1080.

The report-receiving mechanism 1030 receives an audit report from a client machine. The report-receiving mechanism 1030 can be a network port, a wireless receiver, a radio receiver, a media receiver, or any other receiving component without limitation.

The pattern-detecting mechanism 1040 analyzes entries in an audit report and looks for distinct patterns shown in the report entries. If a distinct pattern is detected, the pattern-detecting mechanism 1040 sends the detected pattern to the security-posture-classifying mechanism 1050 for further processing. The pattern-detecting mechanism 1040 can be any computing component with a processing logic that is capable of detecting a pattern from collected data.

The security-posture-classifying mechanism 1050 receives a pattern from the pattern-detecting mechanism 1040, determines an application classification (or a security posture of client machine) based on the detected pattern, and then outputs the application classification to an interested party such that proper actions can be taken. The security-posture-classifying mechanism 1050 can be any computing device or component with a processing logic that is capable of performing rule-based classification of data patterns.

The storage 1060 can include, but is not limited to, a random access memory (RAM), flash memory, a magnetic storage system, an optical storage system, and magneto-optical storage devices.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for remotely auditing a security posture of a client machine at a centralized server, the method comprising:
   receiving, by the centralized server, a security report from the client machine, wherein the security report comprises entries associated with a plurality of security events, wherein a respective entry of the security report indicates a particular security event to be executed on the client machine, and wherein a respective entry of the security report is generated and encrypted using an entry-specific signing key that is erased after the respective entry is encrypted and before the security event takes effect at the client machine, thereby preventing entries of the security report from being corrupted by a security attack;
   detecting a pattern among entries in one or more reports received from one or more client machines, wherein the pattern indicates a probable security attack, and wherein detecting the pattern involves:
      obtaining a fixed public key for a respective report, wherein the fixed public key provides a decryption key corresponding to a plurality of entry-specific signing keys each used to encrypt an entry of the respective report;
      decrypting entries of the respective report using the corresponding fixed public key;
      determining characteristics of the security event and the client machine configuration from the one or more security reports that were recorded before the security event takes effect; and
      analyzing the determined characteristics to identify the detected pattern; and
   classifying the security posture of the client machine based on the detected pattern.

2. The method of claim 1, wherein at least a part of the report is generated from one or more sources, the sources comprising: the client machine, a router, a cell phone tower, a carrier, network data from a third party, and any other device associated with the client machine.

3. The method of claim 2, further comprising:
   receiving a plurality of reports from a plurality of the sources, wherein a respective report comprises a common element;
   identifying a discrepancy of the common element among the plurality of reports; and
   resolving the identified discrepancy in accordance with a predetermined criterion.

4. The method of claim 1, wherein the report entries comprise one or more characteristics of the security events to facilitate identification of the probable security attack.

5. The method of claim 1, wherein the security events associated with the report entries comprise one or more of:
   installing an executable file;
   opening an attachment in an email message;
   browsing a Uniform Resource Locator (URL) of a website;
   visiting an Internet Protocol (IP) address; and
   making a wireless connection.

6. The method of claim 1, wherein the security events are associated with an application on the client machine:
   that is determined to be malicious;
   that is determined to have vulnerabilities;
   that is not permitted to install or execute under terms of service of the client machine;
   that potentially has a negative impact on the client machine; or
   that needs to be updated, replaced, or removed.

7. The method of claim 4, wherein the plurality of characteristics comprise one or more of:
   a local time;
   a time zone;
   a geographic location;
   a social network;
   a type of an application;
   a user history;
   a device platform type; and
   a device configuration.

8. The method of claim 1, wherein detecting the pattern in the at least one characteristic further comprises:
   generating a list of secure or susceptible security events; and
   determining whether the security events associated with the report entries are present in the list.

9. The method of claim 8, wherein detecting the pattern in the at least one characteristic further comprises detecting a security event that is highly correlated with the probable security attack but is not included in the list, the security event comprising one of:
   an event that occurs on the client machine more or less often than on other devices;
   receipt of an email from a sender not in a user's contact list;
   a connection attempt from an external source;
   a visit to a URL that the user does not navigate to;
   a browser redirection with an invalid field;
   an event following installation of a client application; and
   an event following refusal by the user to install the client application.

10. The method of claim 1, wherein classifying the security posture of the client machine comprises performing one or more of the following operations:
   classifying the client machine as being infected by malware spreading via a wireless connection, wherein the detected pattern shows correlation between the security events associated with the report entries and a geographic characteristic as a function of time;
   classifying the client machine as being infected by malware spreading via an attachment, wherein the detected pattern shows correlation between the security events and a social characteristic;
   classifying the client machine as being infected by a worm, wherein the detected pattern shows that occurrence of the security events is independent of a local time characteristic;
   classifying the client machine as being infected by malware, wherein the detected pattern shows that the occurrence of the security events is notably more frequent than a normal frequency;
   classifying the client machine as being infected by malware, wherein the detected pattern shows a consistent inclusion of a characteristic during the security events; and
   classifying the client machine as being infected by malware, wherein the detected pattern shows that the occurrence of the security events is a function of a platform, an application, or a configuration.

11. The method of claim 1, wherein the report entry further comprises:
one or more ciphertext sections that describe the associated security event in various degrees of details, and
a plaintext section that describes a general classification of the associated security event.

12. The method of claim 1, wherein the client machine is also configured as a server for remotely auditing the security posture of another client machine in a hierarchic or circular architecture.

13. A system for remotely auditing a security posture of a client machine at a centralized server, the system comprising:
a processor;
a memory;
a report receiving mechanism configured to receive a security report at the centralized server from the client machine, wherein the security report comprises entries associated with a plurality of security events, wherein a respective entry of the security report indicates a particular security event to be executed on the client machine, and wherein a respective entry of the security report is generated and encrypted using an entry-specific signing key that is erased after the respective entry is encrypted and before the security s event takes effect at the client machine, thereby preventing entries of the report from being corrupted by a security attack;
a pattern detecting mechanism configured to detect a pattern among entries in one or more reports received from one or more client machines, wherein the pattern indicates a probable security attack, and wherein while detecting the pattern, the pattern detecting mechanism is configured to:
obtain a fixed public key for a respective report, wherein the fixed public key provides a decryption key corresponding to a plurality of entry-specific signing keys each used to encrypt an entry of the respective report;
decrypt entries of the respective report using the corresponding fixed public key;
determine characteristics of the security event and the client machine configuration from the one or more security reports that were recorded before the security event takes effect; and
analyze the determined characteristics to identify the detected pattern; and
a security posture classifying mechanism configured to classify the security posture of the client machine based on the detected pattern.

14. The system of claim 13, where in at least a part of the report is generated from one or more sources, the sources comprising: the client machine, a router, a cell phone tower, a carrier, network data from a third party, and any other device associated with the client machine.

15. The system of claim 13, further comprising:
receiving a plurality of reports from a plurality of resources, wherein a respective report comprises a common element;
identifying a discrepancy of common element among the plurality of reports; and
resolving the identified discrepancy in accordance with a predetermined criterion.

16. The system of claim 13, wherein the report entries comprise one or more characteristics of the security events to facilitate identification of the probable security attack.

17. The system of claim 13, wherein the security events associated with the report entries comprise one or more of:
installing an executable file;
opening an attachment in an email message;
browsing a Uniform Resource Locator (URL) of a website;
visiting an Internet Protocol (IP) address; and
making a wireless connection.

18. The system of claim 13, wherein the security events are associated with an application on the client machine:
that is determined to be malicious;
that is determined to have vulnerabilities;
that is not permitted to install or execute under terms of service of the client machine;
that potentially has a negative impact on the client machine; or
that needs to be updated, replaced, or removed.

19. The system of claim 13, wherein the plurality of characteristics comprise one or more of:
a local time;
a time zone;
a geographic location;
a social network;
a type of an application;
a user history;
a device platform type; and
a device configuration.

20. The system of claim 13, wherein the pattern detector is further configured to:
generate a list of secure or susceptible security events; and
determine whether the security events associated with the report entries are present in the list.

21. The system of claim 20, wherein the pattern detector is further configured to detect a security event or security state that is highly correlated with the probable security attack but is not included in the list, the security event or security state comprising one of:
an event that occurs on the client machine more or less often than on other devices;
receipt of an email from a sender not in a user's contact list;
a connection attempt from an external source;
a visit to a URL that the user does not navigate to;
a browser redirection with an invalid field;
an event following installation of a client application; and
an event following refusal by the user to install the client application.

22. The system of claim 13, wherein the security posture classifier is configured to perform one or more of the following operations:
classifying the client machine as being infected by malware spreading via a wireless connection, wherein the detected pattern shows correlation between the security events associated with the report entries and a geographic characteristic as a function of time;
classifying the client machine as being infected by malware spreading via an attachment, wherein the detected pattern shows correlation between the security events and a social characteristic;
classifying the client machine as being infected by a worm, wherein the detected pattern shows that occurrence of the security events is independent of a local time characteristic;
classifying the client machine as being infected by malware, wherein the detected pattern shows that the occurrence of the security events is notably more frequent than a normal frequency;
classifying the client machine as being infected by malware, wherein the detected pattern shows a consistent inclusion of a characteristic during the security events; and
classifying the client machine as being infected by malware, wherein the detected pattern shows that the occurrence of the security events is a function of a platform, an application, or a configuration.

23. The system of claim 13, wherein the log entry further comprises:
   one or more ciphertext sections that describe the associated security event or security state or both in various degrees of details, and
   a plaintext section that describes a general classification of the associated security event or security state or both.

24. The system of claim 13, wherein the client machine is also configured as a server for remotely auditing the security posture of another client machine in a hierarchic or circular architecture.

\* \* \* \* \*